United States Patent [19]
Harrold et al.

[11] Patent Number: 6,120,634
[45] Date of Patent: Sep. 19, 2000

[54] METHOD AND APPARATUS FOR FORMING AGRICULTURAL DRIP TAPE

[75] Inventors: Charles R. Harrold; Theodore J. Bren, Jr., both of Walla Walla, Wash.

[73] Assignee: Micro Irrigation Technologies, Inc., Walla Walla, Wash.

[21] Appl. No.: 08/805,173

[22] Filed: Feb. 26, 1997

[51] Int. Cl.⁷ ................................................. B29C 53/00
[52] U.S. Cl. ...................... 156/203; 156/218; 156/244.11
[58] Field of Search .................... 156/203, 218, 156/244.11, 244.23; 239/542

[56] References Cited

U.S. PATENT DOCUMENTS

| | | |
|---|---|---|
| 2,484,965 | 10/1949 | Slaughter . |
| 2,575,138 | 11/1951 | Slaughter . |
| 3,467,142 | 9/1969 | Boyle et al. . |
| 3,478,138 | 11/1969 | Friesner . |
| 3,816,206 | 6/1974 | Coster . |
| 3,870,236 | 3/1975 | Sahagun-Barragan . |
| 3,895,085 | 7/1975 | Suzuki et al. . |
| 3,896,999 | 7/1975 | Barragán . |
| 4,047,995 | 9/1977 | Leal-Diaz . |
| 4,060,200 | 11/1977 | Mehoudar . |
| 4,095,084 | 6/1978 | Shutt . |
| 4,285,472 | 8/1981 | Okada et al. . |
| 4,323,533 | 4/1982 | Bramhall . |
| 4,473,191 | 9/1984 | Chapin ................................... 239/542 |
| 4,473,525 | 9/1984 | Drori . |
| 4,555,282 | 11/1985 | Yano ................................. 156/244.23 |
| 4,642,152 | 2/1987 | Chapin ................................... 156/203 |
| 4,702,787 | 10/1987 | Ruskin et al. . |
| 4,722,759 | 2/1988 | Roberts et al. .......................... 156/203 |
| 4,749,535 | 6/1988 | Matsuda . |
| 5,022,940 | 6/1991 | Mehoudar . |
| 5,076,498 | 12/1991 | Townsend . |
| 5,122,044 | 6/1992 | Mehoudar . |
| 5,123,984 | 6/1992 | Allport et al. .......................... 156/203 |
| 5,163,622 | 11/1992 | Cohen . |
| 5,246,171 | 9/1993 | Roberts ................................... 239/542 |
| 5,271,786 | 12/1993 | Gorney et al. . |
| 5,282,578 | 2/1994 | De Frank ............................... 239/542 |
| 5,282,916 | 2/1994 | Bloom . |
| 5,318,657 | 6/1994 | Roberts ................................... 156/203 |
| 5,324,371 | 6/1994 | Mehoudar . |
| 5,324,379 | 6/1994 | Eckstein . |
| 5,333,793 | 8/1994 | DeFrank ................................. 239/542 |
| 5,387,307 | 2/1995 | Roberts ................................... 156/203 |
| 5,458,712 | 10/1995 | DeFrank ................................. 156/203 |
| 5,522,551 | 6/1996 | DeFrank et al. ......................... 156/203 |
| 5,634,595 | 6/1997 | DeFrank et al. ......................... 239/542 |
| 5,688,072 | 11/1997 | Meyer .................................... 239/542 |
| 5,722,601 | 3/1998 | DeFrank ................................. 239/542 |

*Primary Examiner*—Michael W. Ball
*Assistant Examiner*—Jessica Rossi
*Attorney, Agent, or Firm*—Nixon & Vanderhye P.C.

[57] ABSTRACT

A process for forming irrigation drip tape includes, broadly, the steps of a) supplying a longitudinally continuous strip of flexible plastic material in a first direction; b) heating a narrow band of the strip along a longitudinal axis thereof; c) depositing a continuous bead of material on an upper surface of the strip, along the narrow band, while the strip moves in the one direction; d) cooling the strip and the bead; e) folding the strip longitudinally so that the longitudinal edges overlap; and f) sealing said longitudinal edges to form a tubular drip tape with a longitudinal, overlapped seam, with the bead extending parallel to the seam and in opposed, facing relationship thereto. Apparatus for carrying out the process includes a first supply station adapted to supply a continuous length of flexible material; a second station including a trimmer roll and a pair of associated knife blades arranged to trim opposite longitudinal edges of the material to form a strip of predetermined width; a third station including a slitter wheel arranged to cut axially spaced longitudinal slits in the strip; a fourth station for applying a preformed bead of material onto a surface of the strip, the bead having one or more secondary flow paths formed therein; and a fifth station including a plurality of rollers arranged to wrap the strip about a mandrel into tubular form; a nozzle arranged to apply an adhesive bead along one of the longitudinal edges of the strip; and at least one pressure roller for applying pressure along the longitudinal edge to form a bonded seam between the longitudinal edges of the strip.

20 Claims, 15 Drawing Sheets

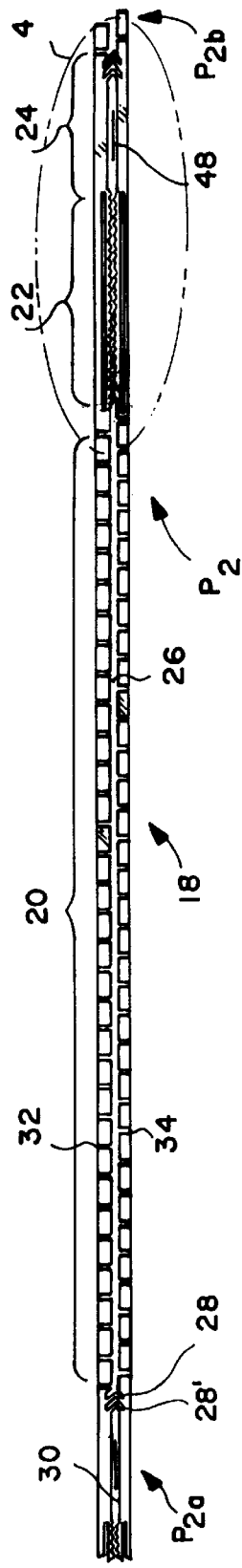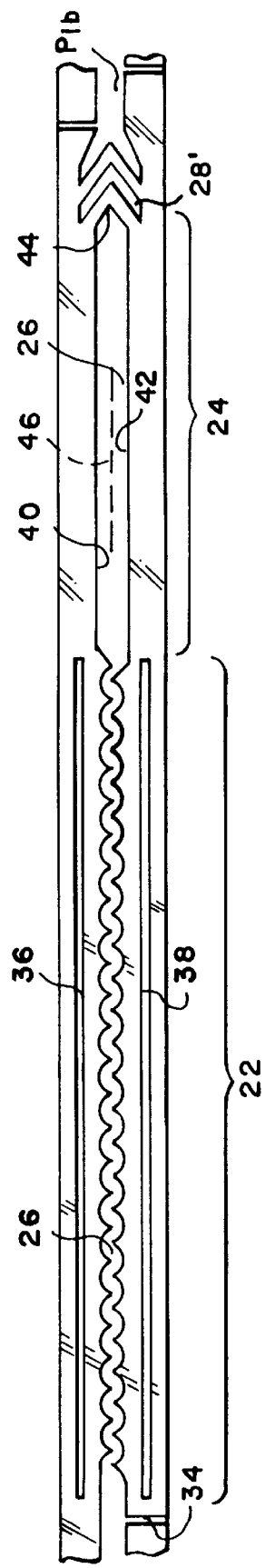

METHOD AND APPARATUS FOR FORMING AGRICULTURAL DRIP TAPE

TECHNICAL FIELD

This invention relates to agricultural irrigation and specifically, to a method and apparatus for forming drip tape or hose for below or above ground drip or trickle irrigation systems.

BACKGROUND

Drip irrigation hose or tape has been available now for several years. Typically, agricultural drip tapes are formed from relatively thin, flexible, continuous plastic strips folded over and seamed along a longitudinal edge to establish a primary flow path. One or more secondary flow paths are typically formed within the primary flow path by fixing discrete emitter devices along the length of the tape or hose, or by applying parallel strips of plastic material within the hose interior (for example, in the area of the longitudinal edge overlap) to form a secondary flow path. It is generally the case that the primary flow path is connected to the water supply with inlets and outlets to and from the secondary flow path, so that water flows from the primary path to the secondary flow path, and then out of the drip tape in a controlled fashion. Some tape or hose constructions incorporate turbulence inducing regions in the secondary flow path to prevent clogging and reduce the sensitivity of the flow rate to pressure changes.

Drip irrigation hoses or tapes are well represented in the patent literature, and examples may be found in U.S. Pat. Nos. 3,870,236; 3,896,999; 4,009,832; 4,247,051; 4,430,020; 4,473,191; 4,874,132; 4,880,167; 4,984,739; 5,163,622; 5,181,532; 5,203,503; 5,207,386; 5,282,578; and 5,333,793.

Despite the wealth of innovative drip irrigation technology, significant areas of concern remain relating to reliability and cost. For drip tape to be effective and commercially viable, it is essential that the secondary flow path not become clogged with solid matter in the water supply, or by outside debris blocking the outlets. At the same time, to be commercially viable, drip tape must be economical to manufacture.

In commonly owned, co-pending application Ser. No. 08/570,014, filed Dec. 14, 1995, now U.S. Pat. No. 5,688,072 there is disclosed a new and improved drip tape construction which offers advantages not found in the drip tape constructions of which we are presently aware. In the exemplary embodiment, the tape is formed by a strip of flexible PE material folded over and seamed along overlapped longitudinal edges. Interiorly of the tape, and in an area remote from the overlapped seam, there is a pre-formed longitudinally extending plastic bead or strip which defines a series of axially spaced secondary flow paths.

Each secondary flow path has a secondary flow channel including inlet, turbulence inducing, and outlet regions, all of which are preformed on one side of the hot melt bead or strip. The pattern side of the bead is applied face down on the sheet so that the sheet wall itself closes the secondary flow channel except for a plurality of inlets formed in the bead at longitudinally spaced locations along the inlet region. These inlets are arranged perpendicular to the longitudinal axis of the tape, and thus also perpendicular to the secondary flow channel. The inlets are located on both sides of the secondary flow channel, in longitudinally spaced relationship, with the inlets on one side of the secondary flow channel offset longitudinally with respect to the inlets on the opposite side of the secondary flow channel. In this exemplary embodiment, the inlet region extends well over half the total length of the secondary flow path, but this dimensional relationship may vary.

The inlet region leads to a turbulence inducing region formed by a series of peaks and valleys on opposite sides of the secondary flow channel, in longitudinally offset relationship so that the peaks on one side of the secondary flow channel in this region project towards the valleys on the opposite side of the flow channel. The peaks projecting from both sides of the secondary flow channel lie along a line through the center of the secondary flow channel in the exemplary embodiment, thus creating a tortuous path which induces turbulence in the secondary flow path. It is this turbulence that dissipates energy and creates zero or near zero pressure discharge to atmosphere. The turbulence also prevents clogging of the secondary flow path by debris or other solid impurities within the primary water supply.

Downstream of the turbulence inducing region, an outlet region is provided which communicates with an elongated slit in the tape wall which allows the water in the secondary flow path to escape in a controlled drip-like fashion. The outlet region, or reservoir, is otherwise axially closed in the downstream direction, thus isolating the path from the inlet region of the next adjacent downstream secondary flow path, and thus also forcing all water to exit via the elongated slit in the tape wall. In the preferred arrangement, the secondary flow paths are formed of substantially transparent material, for reasons stated in the '014 application.

DISCLOSURE OF THE INVENTION

In accordance with this invention, a process and related apparatus are disclosed for forming drip tape, similar, but not limited to that described above, in an efficient and reliable manner.

In the exemplary embodiment of this invention, a modular production line is utilized, with the various modules or stations configured to perform certain manufacturing and/or assembly steps within the overall process. Generally, molten material is extruded from an extrusion die in a first module, with the material extruded onto an intermediate one of a vertical calendar stack of three rolls. The invention is not limited, however, to supplying the strip material from an extruder. In this exemplary embodiment, the extrudate travels around and between the two lower rolls in the calendar stack where it is supported, sized, surface finished and thermally stabilized. A thin strip or film, about 3–4½ inches (depending on final drip tape specifications) in width (from 6 to 25 mil in thickness, again depending on final specification) leaves the calendar stack and travels to a second module where the sheet or film is trimmed to a desired width, e.g., about 2.5–3.5 inches. Trimmed scrap may be fed back into the extruder for recycling. In this second module, additional thermal stabilization (i.e., cooling) may take place as required. As the strip or film exits this second module, it may be electronically scanned for impurities or holes, utilizing a conventional scanner.

The sheet or film then progresses to a third module or station where the material is slit at predetermined, longitudinally spaced locations on or adjacent to the longitudinal centerline of the strip, in order to provide outlet openings or vents in the strip wall, one for each secondary flow path. Provisions for thermal management need not be incorporated into this third module but can be if desired and/or needed. A phase adjuster unit is integrated into this module for the purpose of timing the slitting operation with the specific secondary path geometry added at the following module. The pitch or spacing of the slits can be changed at this location by, for example, changing the size of the slitting wheel or by changing the number of slitting knives on the wheel.

The slit film or strip now progresses to a fourth module or station where a second strip or bead is extruded onto a rotating form wheel which has a specific groove geometry etched or engraved on its periphery, the groove geometry corresponding to one or more secondary flow paths. As the form wheel rotates, it brings the extruded bead into contact with a continuous belt which compresses or forces the molten extrudate into the groove configuration on the periphery of the wheel, thus conforming the still molten material to the secondary flow path geometry. The continuous belt then contains or supports the extrudate through a portion of a revolution of the wheel, thus providing time for the extrudate to solidify or cure in the shape created by the geometry of the wheel groove. While the wheel may have a continuous groove geometry (including plural, isolated flow paths) on its periphery in the exemplary embodiment, it is also possible to create discrete grooves corresponding to individual secondary flow paths which could be used to solidify or cure deposits of various material such as thermosets, thermoplastics, rubber, and silicone. This same wheel configuration could also be used to transport pre-formed emitting devices to a bonding point on the sheet or film. Both the form wheel and the belt may have provisions for thermal management by internal passages or other means. In addition, the tension of the continuous belt may be varied via adjustable rolls which also allow for different sizes of form wheels.

The solidified and now formed bead exits the form wheel groove and travels around one or more additional rolls onto a transfer roll. At this point, the now formed and cooled secondary flow path bead is bonded to the first underlying strip, with the aid of pressure rollers and heat. During the transfer/bonding step, the strip is supported by an upper one of a pair of rolls which may be thermally regulated as well. The pressure applied by the pressure rollers is controlled and adjustable.

After the addition of the second extrudate forming the secondary flow path(s), the film or strip progresses to a fifth station where it is closed or seamed. This is accomplished by wrapping the semi-finished product around a properly sized mandrel and maintaining continuous contact with the mandrel using a series of rollers mounted on movable arms, in combination with a vacuum applied through the mandrel. This results in a seam or overlap along the length of the sheet or film which is held open until a third extrudate in the form of a hot melt adhesive bead is introduced between the layers or overlap in order to enable welding or bonding of the overlapped edges of the sheet or film, to thereby form a continuous water-tight seam along the length of the strip. A pair of nip rolls effect the bonding action using a combination of pressure and thermal management. Additional rolls provide further thermal management as well as a platform for verification of seam closure. It is to be understood that other methods of closure such as sonic welding, thermal impulse welding, laser welding, infrared and heat bonding are viable alternatives which may be incorporated into the process. In addition, butt or nip welding may also be used to close the sheet or film into tubular form.

The seamed tubular drip tape product then progresses through a cooling area or station where it is weaved back and forth as necessary through a series of rollers, providing sufficient time for the finished drip tape to cool prior to packaging. Product codes and product information may be applied on the drip tape exterior at the exit end of the cooling area or in other suitable areas.

Finally, the drip tape is passed to the last station where pull or tension is applied to the drip tape product by a pair of rolls. The pull or tension load is monitored and regulated via a load cell incorporated in the roll drive which assures correct and uniform tension of the product as it exits the production process and moves toward a packaging station. The latter does not form a part of this invention.

Accordingly, the process in accordance with this invention in its broader aspects includes the steps of:
  a) supplying a longitudinally continuous strip of flexible plastic material in a first direction;
  b) heating a narrow band of the strip continuously along its length;
  c) depositing a continuous pre-formed bead of plastic material on an upper surface of the strip, along the narrow band, while the strip moves in the one direction;
  d) cooling the strip and the bead;
  e) folding the strip longitudinally so that the longitudinal edges overlap; and
  f) sealing the longitudinal edges to form a tubular drip tape with a longitudinal, overlapped seam, with the bead extending parallel to the seam and in generally opposed, facing relationship thereto.

In another aspect, the invention relates to a process of forming agricultural drip tape wherein a primary flow path is formed by folding and seaming a continuous length of flexible plastic film along longitudinal edges thereof, and where a secondary flow path is provided on an interior surface of the film prior to folding and seaming, wherein the secondary flow path is formed by:
  a) continuously extruding a thin bead of material into a peripheral groove formed in an external surface of a rotating form wheel, the groove having a secondary flow path configuration;
  b) confining the bead of material in the peripheral groove for at least part of the circumference of the wheel by engaging the wheel with an endless belt arranged to overlie the groove; and
  c) depositing the bead of material on the film along a narrow and of the film.

The apparatus in accordance with the invention broadly includes:
  a first supply station adapted to supply a continuous length of flexible material;
  a second station including a trimmer roll and a pair of associated knife blades arranged to trim opposite longitudinal edges of the material to form a strip of predetermined width;
  a third station including a slitter wheel arranged to cut axially spaced longitudinal slits in the strip;
  a fourth station for applying a bead of material onto a surface of the strip as the strip travels about a roll, the fourth station having at least one pressure roller to apply pressure to the bead as it is joined to the surface, the bead having one or more secondary flow paths formed therein, each flow path having an outlet area and wherein drives of the third and fourth stations are coordinated so that each outlet area lies radially adjacent a corresponding one of the longitudinal slits; and
  a fifth station including a plurality of rollers arranged to wrap the strip about a mandrel into tubular form; a nozzle arranged to apply an adhesive bead along one of the longitudinal edges of the trip; and at least one pressure roller for applying pressure along the longitudinal edge to form a bonded seam between the longitudinal edges of the strip.

Other objects and advantages of the subject invention will become apparent from the detailed description which follows.

BRIEF DESCRIPTION OF THE DRAWINGS

FIG. 3 is a partial plan view of a secondary flow path strip located interiorly of the tube in FIG. 1;

FIG. 4 is an enlarged view of the circled area labeled "4" in FIG. 3;

DETAILED DESCRIPTION OF THE DRAWINGS

Figure 1:
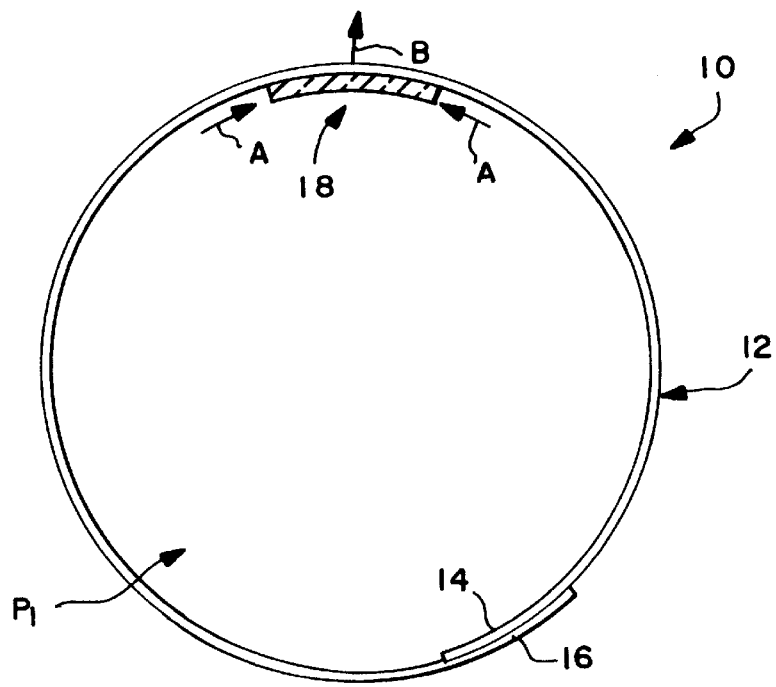
FIG. 1 is a cross section of a drip tape construction in accordance with an exemplary embodiment of the invention.
Figure 2:
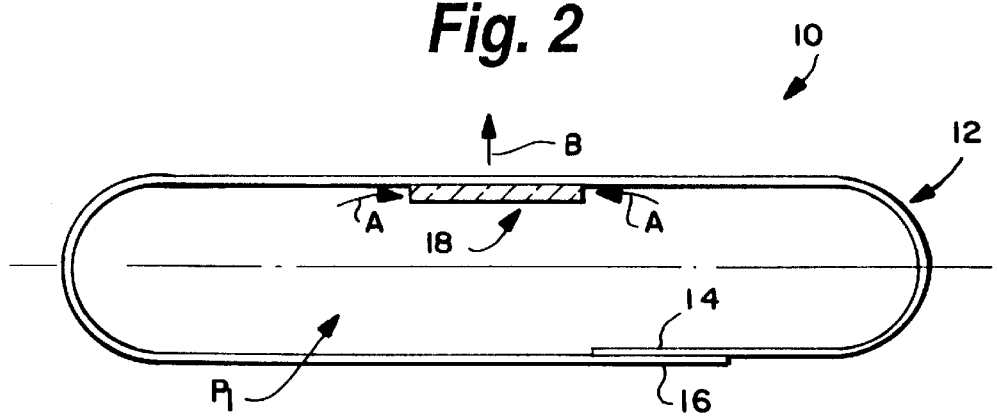
FIG. 2 is a view of the drip tape shown in FIG. 1, but in a partially flattened condition.

Referring to FIGS. 1–4, a drip tape configuration which is illustrated similar to that described in co-pending application Ser. No. 08/570,014. The drip tape 10 includes a flexible plastic strip or film 12 with opposite longitudinal edges 14 and 16 overlapped and bonded to form a tubular tape or hose with a single longitudinal seam. A longitudinally oriented strip of plastic material 18 is located on the inner surface of the tape at a location remote from the overlapped seam. The tape itself forms a primary flow path $P_1$ while the strip 18 is pre-formed to define a plurality of axially aligned secondary flow paths $P_2$ (see FIG. 3), described further below. The secondary flow paths extend along and parallel to the longitudinal axis of the tape. Generally, water flows into the secondary flow paths from the primary flow path through laterally oriented inlets in both side walls of the strip 18 (see arrows "A"). Water exits the secondary flow paths to atmosphere through longitudinally oriented slits formed in the tape wall (see arrows "B").

In the exemplary embodiment, the pattern formed in one side of the strip 18 is best seen in FIGS. 3 and 4. The pattern defines a plurality of secondary flow paths $P_2$, $P_{2a}$, $P_{2b}$, etc., in discrete longitudinal segments, e.g., about every 12" along the length of the bead or strip. It will be appreciated, however, that the secondary flow paths may be spaced at other intervals, e.g., 4", 8", 12", 24", 36", etc., as desired. Each secondary flow path (one shown in FIG. 3) has three distinct regions—an inlet region 20, a turbulence inducing region 22 and an outlet region 24, all within a secondary flow channel 26 running longitudinally or axially through the regions, with a depth of about 0.015". The inlet region 20 of secondary flow path $P_2$ begins at a chevron-shaped end 28, adjacent an isolated chevron 28', thus providing a clear line of demarcation between flow path $P_2$ and the outlet region 30 of the immediately preceding flow path $P_{2a}$. Of course, path isolation shapes other than the illustrated chevron configurations could also be employed. The inlet region includes a plurality of laterally disposed, longitudinally spaced inlets 32 on one side of the strip 18 and a similar number of like inlets 34 on the other side of the strip 18. The inlets 32 on one side of the bead are longitudinally offset from the inlets 32 on the opposite side of the bead thus insuring continuous bead contact with the tape wall. The inlets 32, 34 extend perpendicularly to the secondary flow channel 26 and hence also to the longitudinal axis of the tape. Other inlet configurations could be employed as well, and the invention here is not be considered limited to the illustrated arrangement.

Axially downstream of the inlet region 20, there is formed the turbulence inducing region 22. This region has no inlets or outlets other than at the front and back thereof as defined by the flow channel 26, and describes a tortuous path, defined by alternating peaks and valleys on opposite sides of the secondary flow channel, designed to cause turbulent flow which prevents clogging and which dissipates flow energy to create a zero or near zero discharge of water to atmosphere through the outlets.

Running along the turbulence region 22 are grooves 36, 38 which extend the full length of the region 22, on opposite sides of the flow channel 26. These grooves 36, 38 along with chevron 28' and the general arrangement of inlets 32, 34 are employed to insure uniform distribution of material during the preforming of the hot melt bead, and to improve the definition of the geometry in the turbulence inducing region. In other words, the grooves insure complete "filling" of the geometry in this region and make the path integrity much less sensitive to slight variations in the output of the extruder that applies the hot melt bead 18. Uniformity is particularly important in that bulges or other surface discontinuities are prevented which might otherwise negatively impact on the integrity of the seal between the strip 18 and the tape 12, particularly as it relates to the flow channel 26 and the isolation of the secondary flow paths from each other.

Downstream of the turbulence inducing region 22 is the outlet region or reservoir 24 which is formed by smooth channel side walls 40, 42 and which terminates at a closed, pointed end 44 adjacent the chevron 28 of the next adjacent flow path $P_{2b}$. Water exits the outlet region 26 (of each secondary flow path) by means of a single elongated slit 46 in the wall of the tape 12, centrally located within the region 24.

It will be appreciated that FIGS. 3 and 4 show the strip 18 in plan, with the open pattern facing upwardly. It is this face of the strip 18 which is bonded to the interior surface of the strip 12, so that the secondary flow path 26 is closed along the radially outermost face of the strip by the strip 12. Accordingly, water can enter the secondary flow channel 26 of each path $P_2$ only through inlets 32, 34 and can exit only via the slit 46.

In the above described drip tape construction, the strip 12 is formed of a blend of commercially available polyethylenes. It should be understood that all dimensions and materials recited herein are exemplary only, and may be varied depending on circumstances and objectives. For example, it is well within the skill of the art to engineer material blends (with or without additives) which will meet requirements for specific end use applications. Moreover, the secondary flow path construction as described above is illustrative only, and is intended primarily to facilitate the description of the process and related apparatus which follows.

Figure 5:
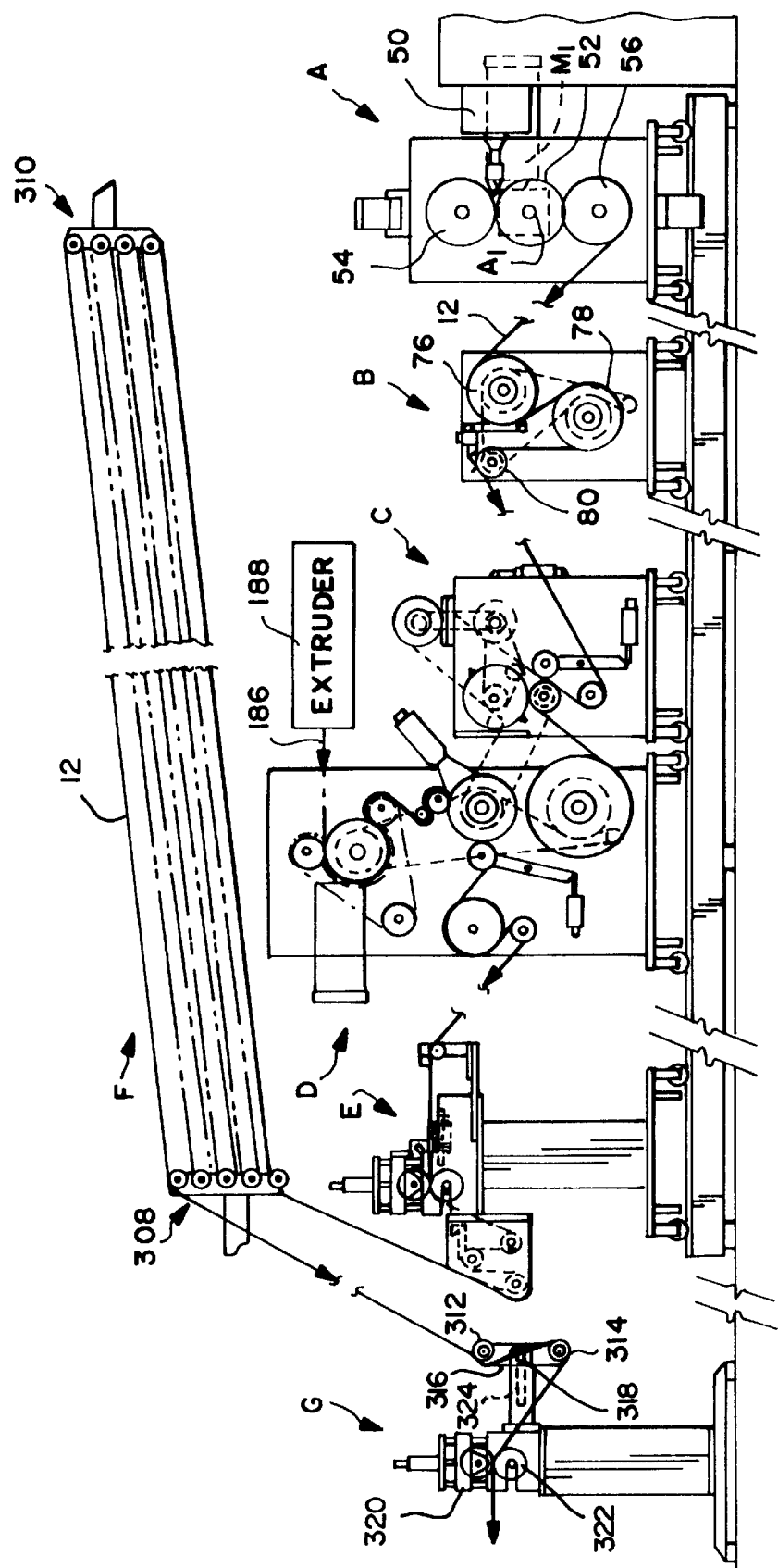
FIG. 5 is a simplified side elevation illustrating the production process and apparatus in accordance with an exemplary embodiment of the invention.

Referring now to FIG. 5, the apparatus for producing drip tape in accordance with this invention includes, generally, a calendar roll stack at station A where the strip of material 12 which will form the outer tubular portion of the drip tape is extruded onto one of the rolls in the stack. The extruded strip 12 progresses to a trimming station B where opposite longitudinal edges of the strip are trimmed to obtain the desired width dimension. The strip then progresses to a slitting station C where longitudinally spaced outlet slits are cut in predetermined locations along the strip. At the next station D, an extruded bead is formed to include one or more secondary flow paths on a form wheel and deposited onto the strip (on what will become an interior surface of the drip tape) in continuous fashion. At station E, the strip 12 is folded and seamed so as to provide a finished tape with the interior secondary flow path in generally opposed relationship to the tape seam. The tape is then cooled as it winds through an overhead cooling area F, before finally passing through a tension control station G. Each of the stations will be described in further detail below. It is noted initially that each station is modular in nature, including a frame supported on casters for ease of adjustment, process flexibility, etc. The frame construction for each module or station need not be described in detail, however, recognizing that one of ordinary skill in the art would find the limited description and illustrations herein sufficient to make and use the invention.

At station A, a strip 12 is extruded from a conventional extruder 50 and deposited onto a roll 52 which is the middle roll of a three roll calendar stack which includes an upper roll 54, the middle roll 52 and a lower roll 56, mounted on vertically aligned axles (one shown at $A_1$). The material could also be cast onto the roll 54 at about a 1 o'clock to 3 o'clock position. It should be understood that the process is generally amenable to other initial strip forming techniques as well and depending on how the material is initially supplied, the configuration of station A may vary. For example, if blown film is to be used, the calendar stack can be eliminated. Other adaptions will be apparent to those skilled in the art.

Figure 6:
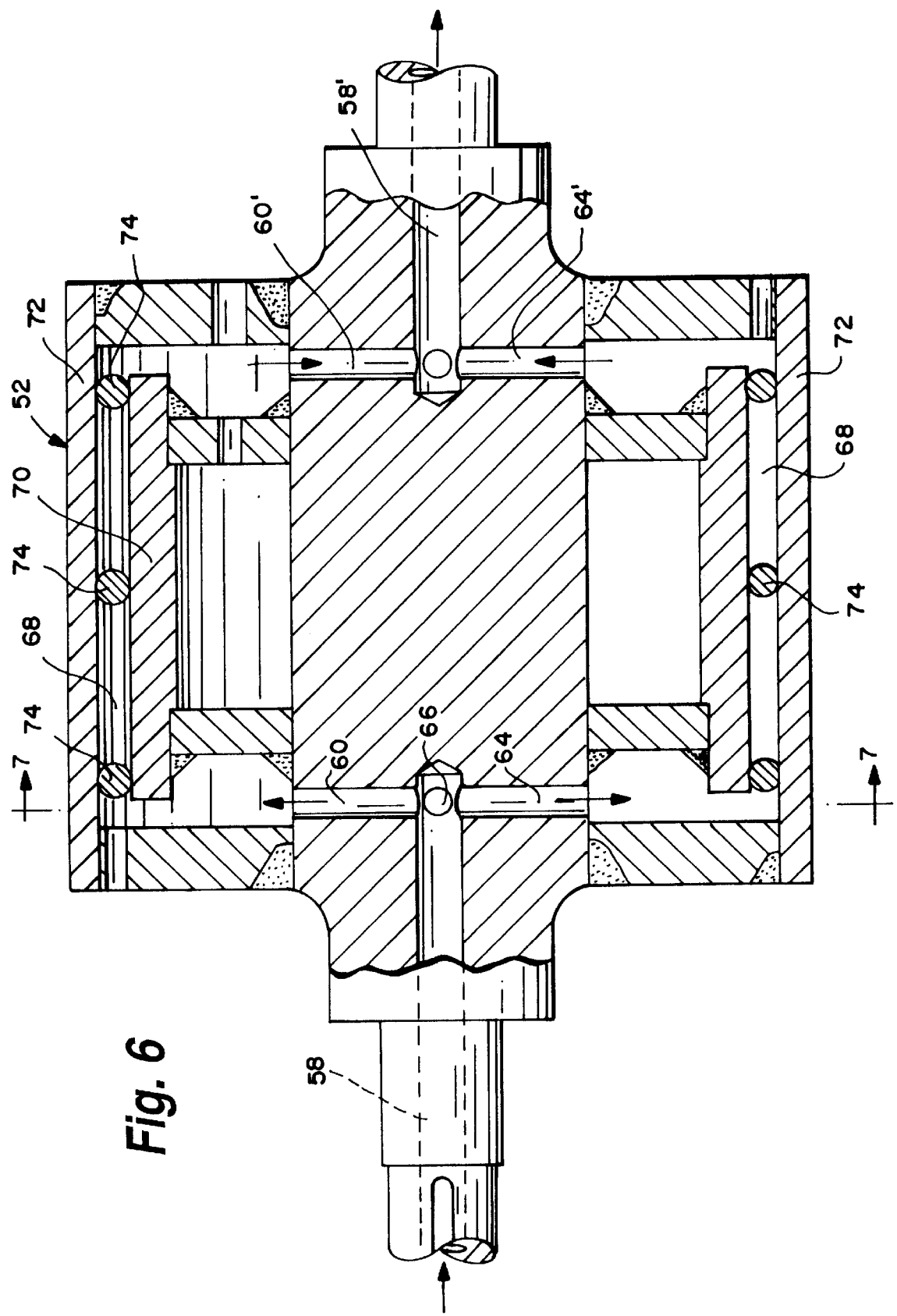
FIG. 6 is a cross-section through a calendar stack roll, illustrating an internal cooling arrangement.
Figure 7:
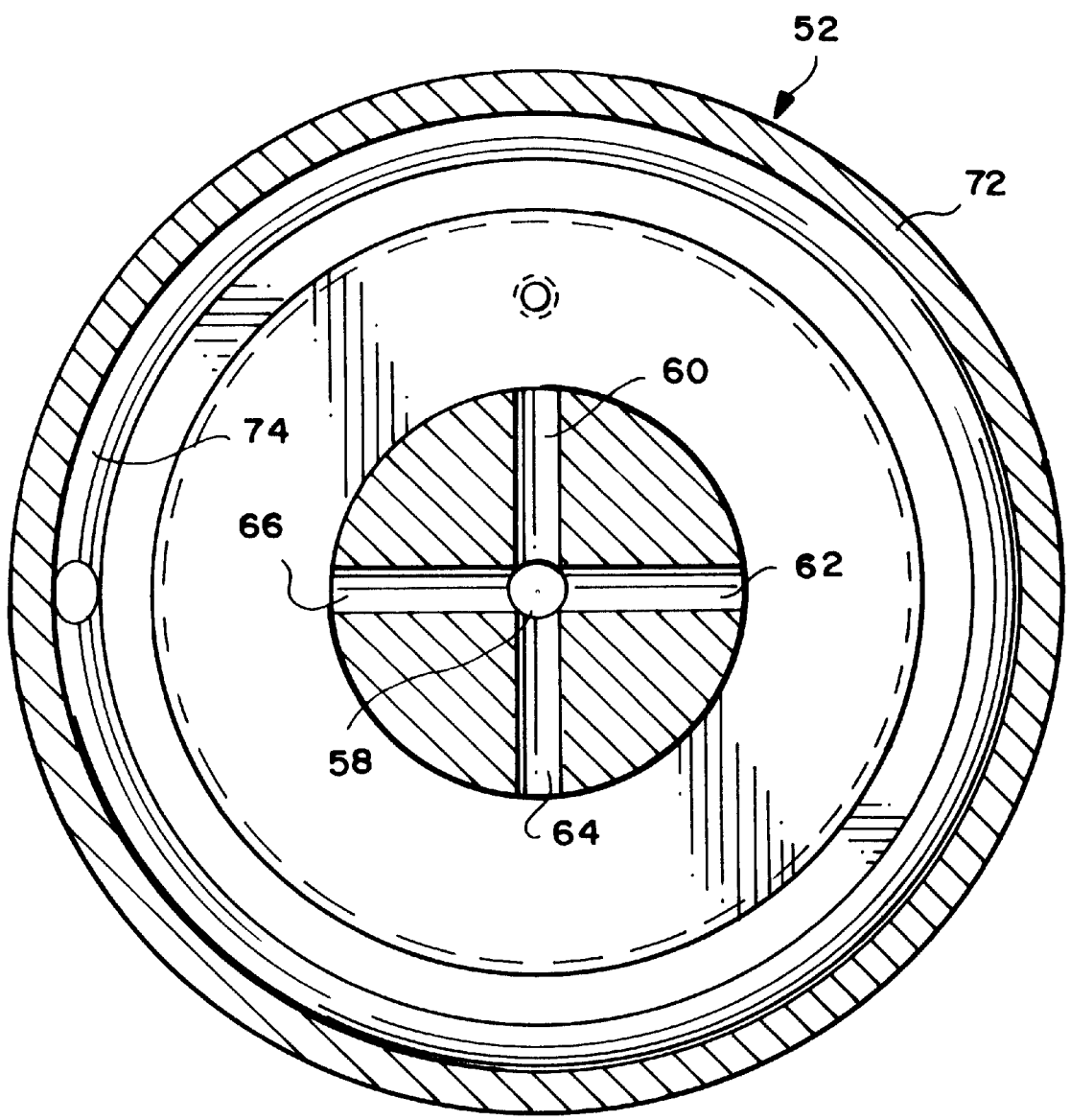
FIG. 7 is a section taken along the line 7/7 of FIG. 6.

The extruded strip is introduced into the nip between rolls 54, 52 and then, after winding 180° on the roll 52, introduced in an opposite direction into the nip between rolls 52 and 56. After winding about 180° on the lower roll 56, the strip is routed to station B. As the strip winds about rolls 52 and 56, it is supported, sized, surface finished and thermally stabilized (i.e., cooled). If necessary, each or all of the rolls 52, 54, 56 may be temperature controlled by an internal cooling circuit of the type shown in FIGS. 6 and 7. Here, roll 52 is provided with an internal, axially oriented feed passage 58, with radial passages 60, 62, 64 and 66 leading to an outer spiral chamber 68 formed between a cylindrical surface 70 and the interior side of the roll peripheral surface 72. A spiral winding 74 within the chamber 68 causes the coolant (water or other suitable cooling liquid) to circulate about and along the roll axis to a plurality of radially arranged passages similar to those at 60, 62, 64, 66 (two shown at 60', 64') and then to an axial outlet passage 58'. Circulation of coolant through one or more of the rolls in the calendar stack may be thermostatically controlled in conventional fashion to stabilize and cool the extruded strip 12 to a desired temperature as it leaves the stack at station A.

The middle roll 52 of the calendar stack is driven directly via a motor $M_1$ while the remaining rolls 54, 56 are chain driven from the motor. This motor, connected to a master controller (not shown), generally controls the speed of the entire process. The remaining drives in the various modules as described below are slaved serially to the calendar drive motor $M_1$ via the master controller. The details of the drive components per se and the slaving of the various motors via a master controller need not be described here insofar as those of ordinary skill in the art would understand how this arrangement may be implemented.

Figure 8A:
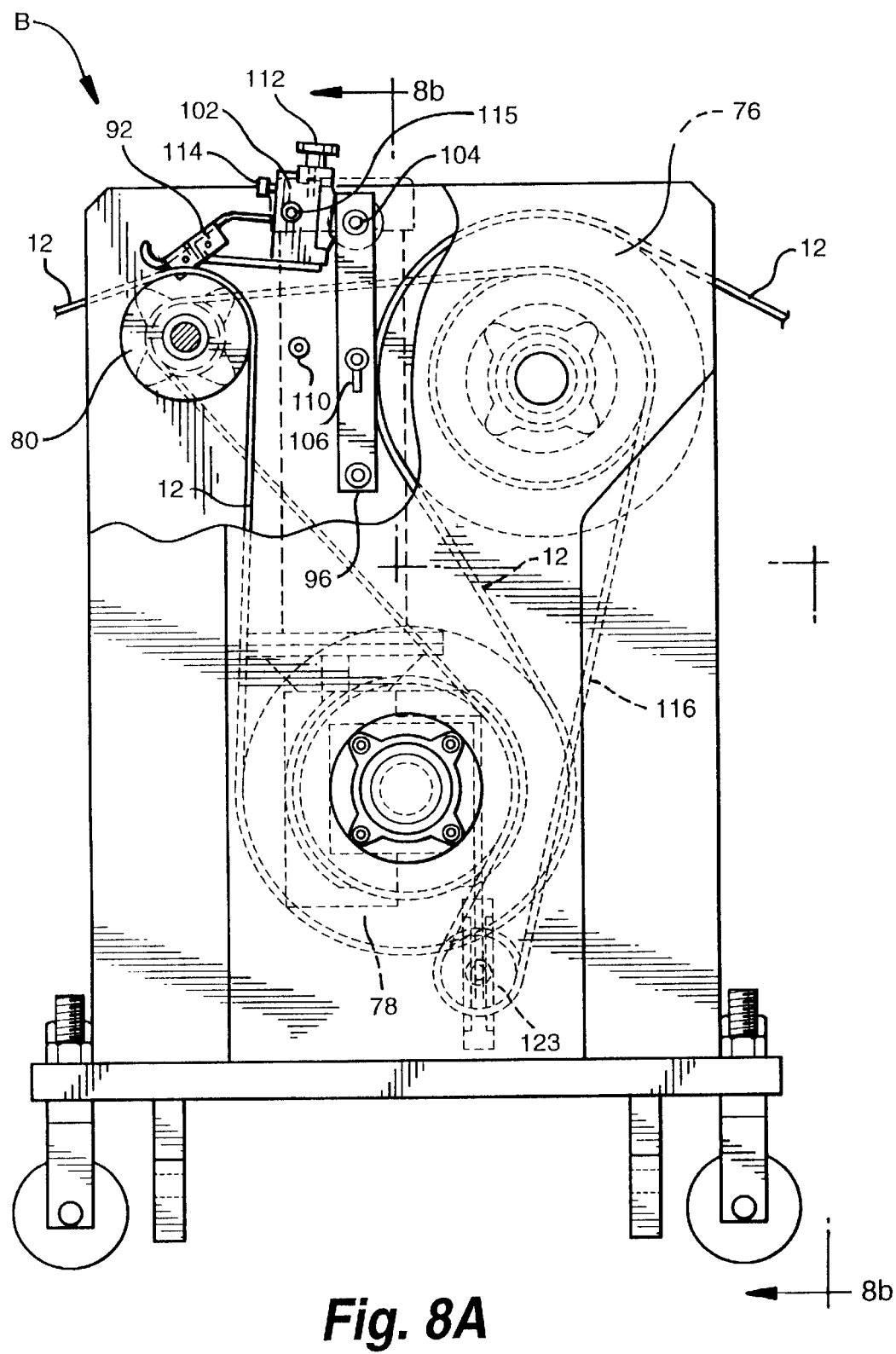
FIG. 8a is an enlarged side elevation of the station labeled B in FIG. 5.
Figure 8B:
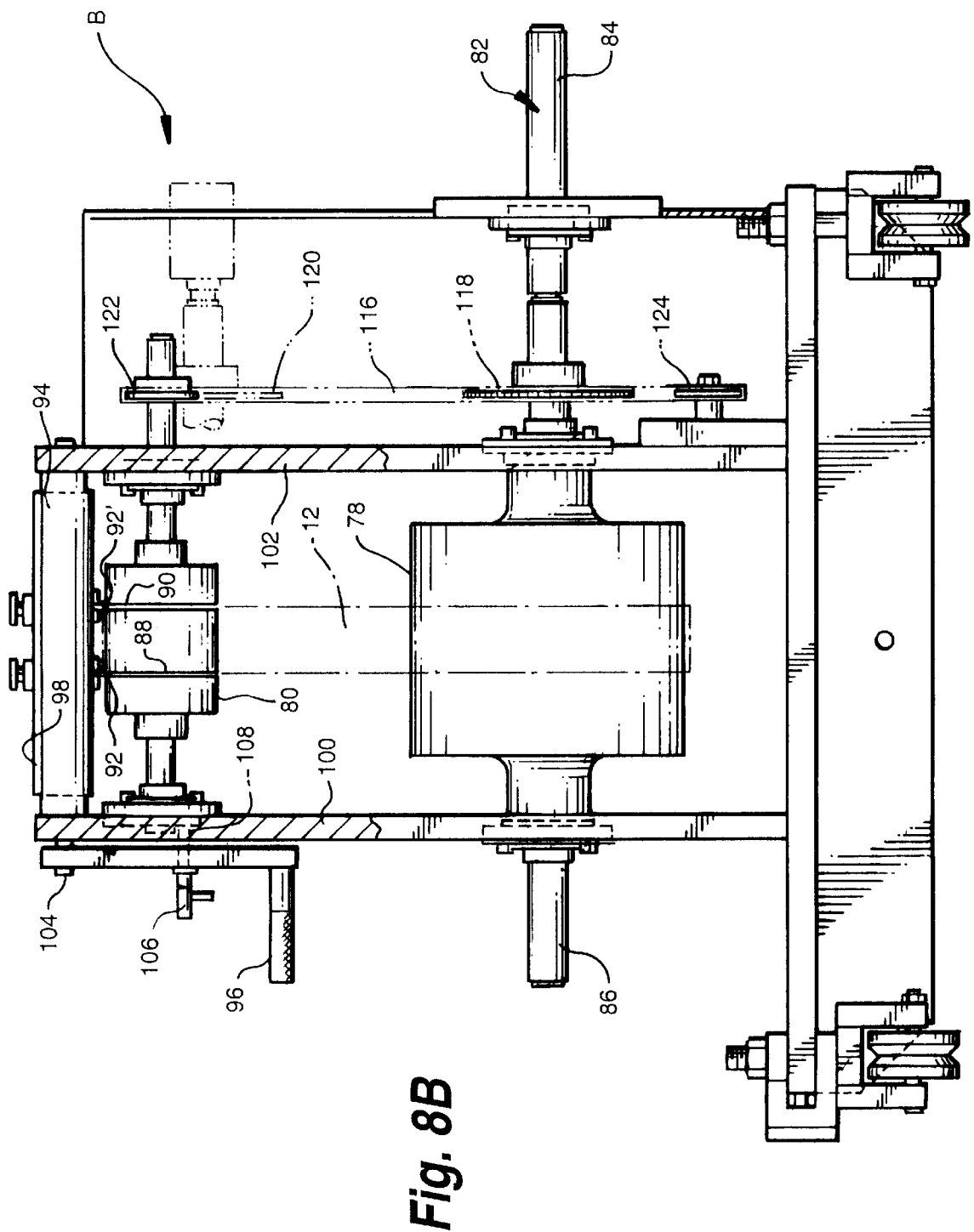
FIG. 8b is an end elevation of the module illustrated in FIG. 8a, partly in section and with some components removed for clarity.

At the trimming station B, and with further reference to FIGS. 8a and 8b, the strip 12 wraps about 180° over a first roll 76 and then about 270° under a second lower roll 78 before traveling substantially vertically upwardly to a trim support roll 80. Both the upper and lower rolls 76, 78 are temperature stabilized, utilizing a common internal cooling circuit similar to that described above in connection with roll 52. The coolant enters roll 78 via a passage in the roll drive shaft 82, with the coolant entering at one end 84 and exiting at an outlet end 86. The drive shaft 82 is driven by a motor (not shown) which, as noted above, is electrically slaved to the calendar stack drive motor $M_1$.

The trim support roll 80 is provided with a pair of spaced peripheral grooves 88, 90 arranged to receive a pair of knife blades 92, 92', mounted in blade support 98, and adjustably supported along a rail 94 located above the trim roll 80.

The blades 92 move between operative and inoperative positions by means of a pivotally mounted trim bar positioning handle 96. The handle 96 is also fixed to the rail 94 which extends between frame members 100, 102 so that rotation of the handle about a pivot shaft 104 lowers the blades 92, 92' into the grooves 88, 90 in roll 80. The blades 92 remain in the grooves 88, 90 as the strip 12 travels over the trim roll 80, removing excess material from the longitudinal edges of the strip. This trimmed waste material may be fed back to extruder 50 for recycling. The blades 92 and handle 96 are shown in FIGS. 8a and 8b in a first position where the knife blades are in an operative, trimming position, with a movable locking bolt 106 in a corresponding detent 108 in the module frame. With the bolt 106 pulled out of the detent 108, the handle 96 can be rotated to a second position where the knife blades are rotated away from roll 80. The handle can be locked in this inoperative position as well by inserting the bolt 106 in a second detent 110 in the module frame.

Lateral adjustment of the blades is achieved by sliding the blade bracket 102 along the rail 94 (FIG. 8b), and locking it in place via knob 112. A second adjustment screw 114 permits fine tuning of the blades about a pivot point 115 on the blade bracket 102. This adjustment mechanism may be of conventional construction, for example, a commercially available Dusenberry #487931 blade kit.

With regard to the drive arrangement at the trimming station B, a chain 116 connects the sprockets 118, 120 and 122 of rolls 78, 76 and 80, respectively, as well as an idler/tensioner roll 123 via sprocket 124. The sprocket 118 is mounted on the drive shaft 82 connected to the previously mentioned drive motor (not shown). Note that in FIG. 8b, the upper roll 76 has been omitted for ease of understanding of the Figure.

The now trimmed strip 12 progresses to the slitter station C. Between stations B and C, a conventional scanner, shown schematically at 126 in FIG. 9a, may be used to inspect the strip 12 for impurities or holes. A suitable scanner is available from Banner, and known as the "Model D12DAB6FV Optical Scanner". Whenever a fault in the sheet is sensed, an alarm signal is sent to a monitoring system connected to the master controller. This permits easy identification of areas of the strip which are defective, requiring a brief shutdown, removal of material and repeat of start up procedures.

At station C (see FIGS. 9a and 9b), the trimmed strip 12 is slit at longitudinally spaced locations to form the previously described outlets from the secondary flow paths (similar to $P_2$) to be added at station D. More specifically, after passing through the scanner 126, the strip 12 wraps approximately 180° about an alignment roll 128 and then partly reverses direction as it travels upwardly and passes over a nip roll 130, again wrapping approximately 180° about the roll. As it passes over the nip roll 130, the strip 12 is engaged by a slitter wheel 132 which supports a plurality of radially mounted blades 134 at peripherally spaced locations (180° intervals in the exemplary embodiment, with optionally useable blade sockets shown at 90° intervals) thereon. The blades 134 are arranged to form the longitudinal slits 46 (FIGS. 3 and 4) with a length substantially equal to the depth of penetration of the blades, generally along but offset from the centerline of the strip 12, with the distance between slits determined by the number of blades 134 on the wheel, the circumference of the wheel, sprocket size, or a combination of the above. As already mentioned, the number and spacing of the slits must correspond to the number and location of secondary flow paths added to the interior wall of the tape in the next following station D. Fine tuning of the slit opening location is achieved by adjustment with a commercially available Candy phase adjuster 136 (the Candy Diff 7 model) operatively connected to the slitter wheel 132 as described below.

The roll 130 carries the strip 12 under the slitter wheel 132 and the blades 134, it being understood that the roll 130 is relieved or grooved (e.g., like the trim roll 80) about its periphery in order to allow the blades 134 to fully penetrate the strip.

An adjustable nip roll 138 holds the strip 12 against the roll 130 on the entry side, prior to engagement with the slitter wheel 132. A cylinder 140 is used to position the nip roll so as to provide the desired tension to the strip as it passes into the nip between roll 130 and slitter wheel 132. The adjustable nip roll 138 is carried on a shaft 141 connected by means of a link arm 142 to a pivot shaft 144 which, in turn, is connected to cylinder 140 via arm 146. Thus, the link arm 142 and arm 146 are pivotable about the shaft 144 via actuation of cylinder 140 to move the nip roll 138 toward or away from roll 130. Note that the roll 130 has been partially omitted from FIG. 9b for the sake of clarity.

The alignment roll 128 can be adjusted by means of knob 146 (FIG. 9a) which is threadably connected to a pusher block 148. This allows one end of the shaft 150 of roll 128 to be adjusted left or right (within the window 152) as viewed in FIG. 9a. In this way, the lateral alignment of the strip 12 can be fine tuned as it approaches the slitter wheel 132, insuring that the outlet slits 46 are formed in the correct locations along the strip.

Figure 9A:
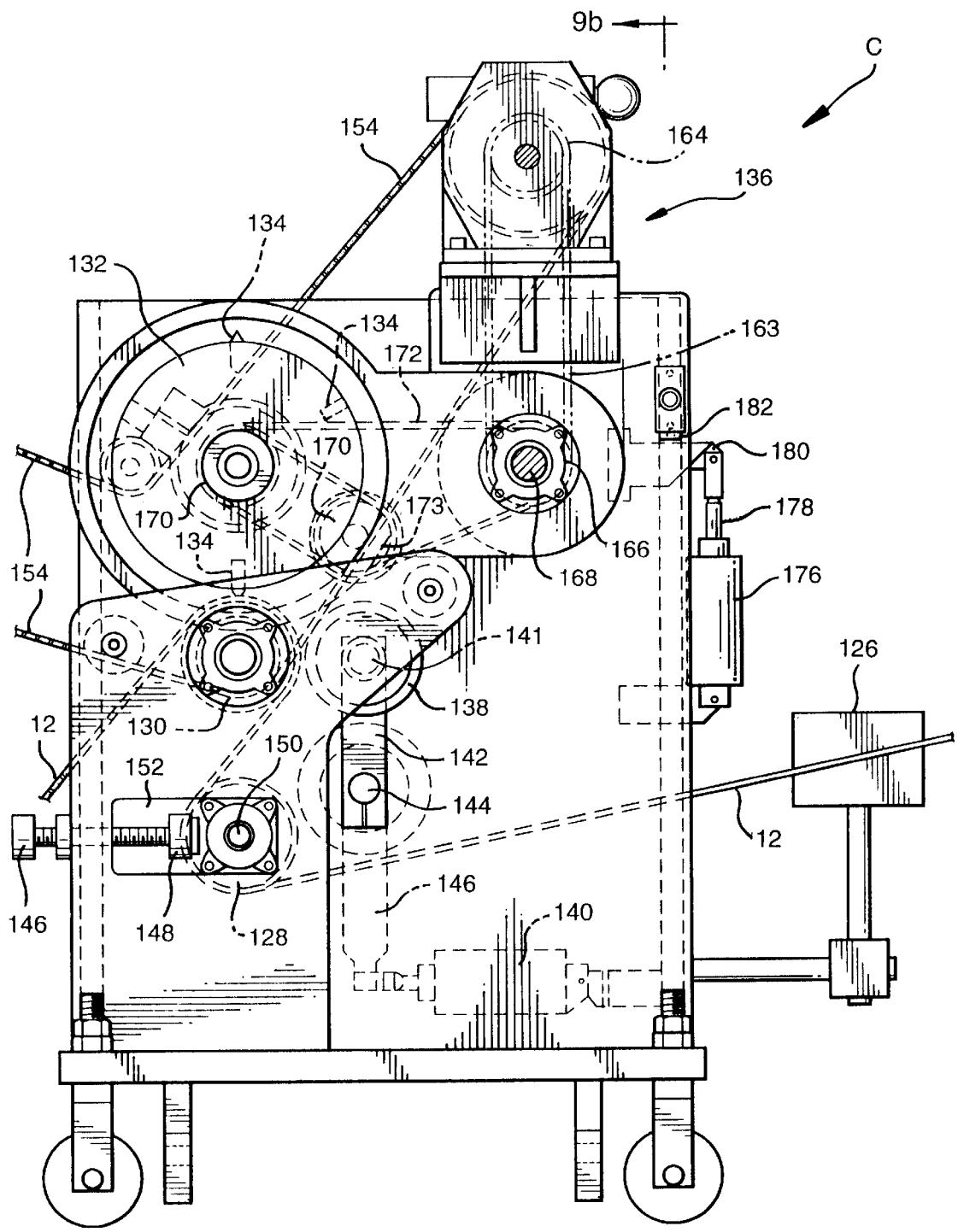
FIG. 9a is an enlarged side elevation of the module labeled C in FIG. 5.
Figure 9B:
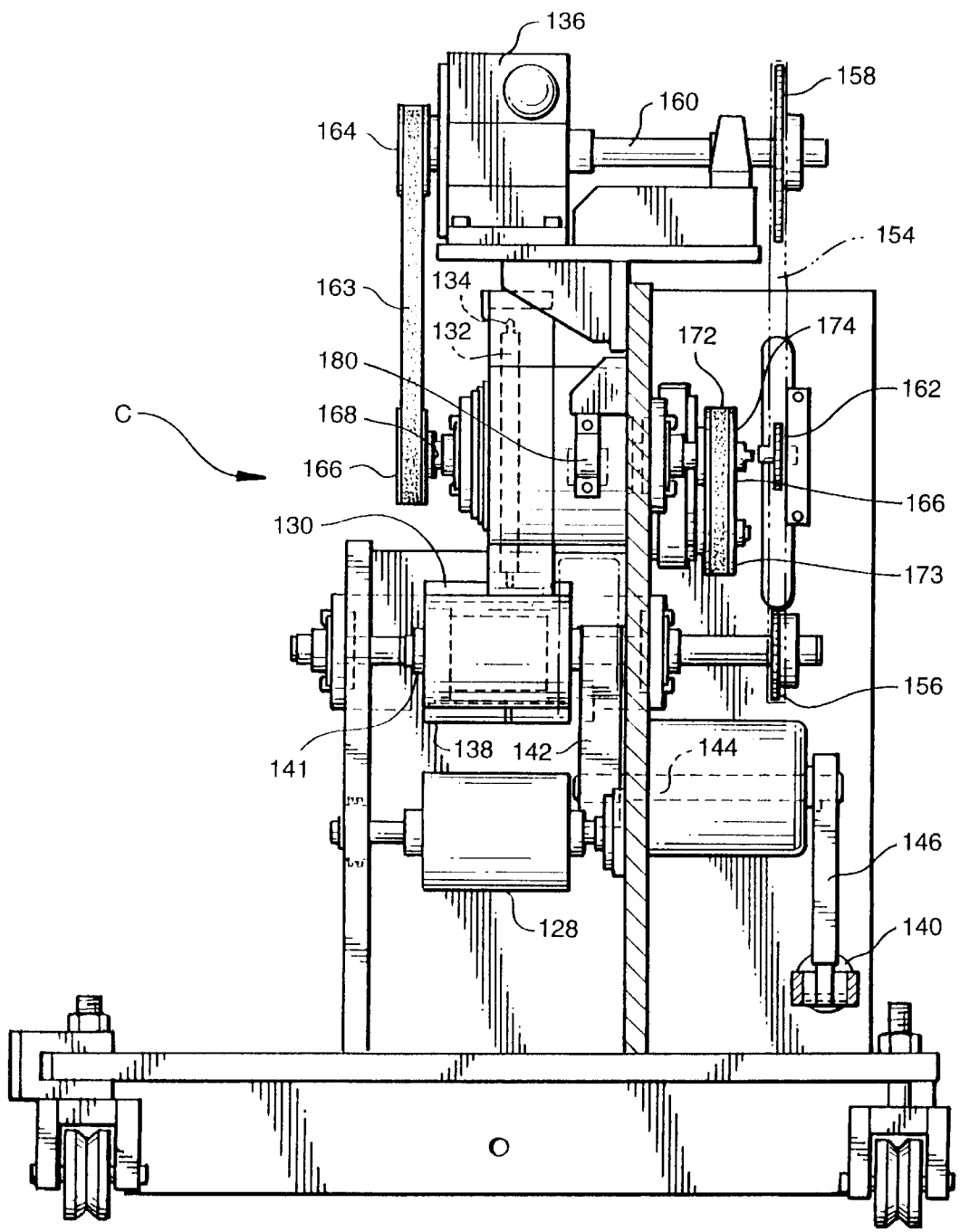
FIG. 9b is an end elevation of the module illustrated in FIG. 9a, partly in section and with some components removed for clarity.

Roll 130 and phase adapter 136 are driven by the next following station D by means of drive chain 154 to insure synchronization between the form wheel secondary flow path geometry and the slitting blades 134 in wheel 132. Thus, the drive chain 154 is connected to a sprocket 156 of wheel 130 (FIG. 9b); to the sprocket 158 attached to phase adjuster shaft 160 (the phase adjuster input); as well as around idler sprocket 162. At the same time, a cog belt 163 extends between a sprocket 164 of the phase adjuster 136 (the phase adjuster output) and a sprocket 166 fixed to a rotating shaft 168 (FIG. 9a). The latter, in turn, is connected to the slitter wheel sprocket 170 via belt 172, tension idler 173 and sprocket 174 (FIG. 9b). A cylinder 176 includes a piston 178 attached to a support arm 180 by which the slitter wheel 132 can be pivoted about the shaft 168 to move the wheel away from the roll 130 during the initial threading of the lead end of the strip 12 through the modules prior to start-up. An adjustable stop mechanism 182 serves as a limit to the movement of arm 180 and, hence, the slitter wheel.

After the strip 12 has been slit at longitudinally spaced locations at station C, it moves on to station D where a continuous bead 186 of material (similar to, but not necessarily the same as, the composition of material 12) is extruded from a second extruder 188 onto a rotating form wheel 190 which has the secondary flow path geometry (one flow path shown at 192 in FIG. 10b) etched or engraved on its periphery in the form of a continuous groove. The secondary flow path geometry per se may be axially repeated at predetermined intervals of, e.g., twelve inches within the continuous groove (separated by, e.g., the chevron 28'). Thus, depending on the size of the form wheel 190 and the length of each flow path, one or more such flow paths may be etched in the form wheel. In the exemplary embodiment, three discrete 12 inch paths are provided on the wheel which has a 36" circumference. For purposes of this example, the flow path per se may be configured as shown in FIGS. 3 and 4, but is not limited thereto.

The form wheel 190 is driven by a motor 194 via shaft 196. The form wheel is engaged with a continuous belt 198 (FIG. 10a) which compresses the material 186 into the groove geometry 192 on the periphery of the wheel 190. This belt 198, preferably made of stainless steel, contains and supports the extruded bead 186 through a portion (about 270°) of the wheel. The belt 198 thus follows a path 180° around roll 200, around roll 204 with a direction change so that it enters the nip between roll 204 and form roll 190. The belt travels substantially 270° about the form roll 190, around roll 202 and back to roll 200. Meanwhile, the extrudate 186 enters the nip between roll 204 and form roll 190 so that it is sandwiched between the belt 198 and the roll 190. The material 186 then follows the belt about the roll 202 (now outside the belt 198) before diverging from the belt to transfer rolls 206 and 208 as described further below. The path described allows the material 186 to stabilize and cool before it is added to the strip 12.

Note that rolls 200, 202 and 204 are adjustable radially inwardly and outwardly relative to the axis of form roll 190. Thus, rolls 200, 202 and 204 are mounted for movement within respective slots 210, 212, 214 by means of respective adjustment rods 216, 218, 220. This feature permits the form roll diameter to be varied as desired. Rolls 200, 202 and 204 are also internally temperature controlled (by for example, internal circuits similar to that shown in FIGS. 6 and 7), and these rolls determine the temperature of the belt 198 by conduction.

In the lower portion of station D, a first pre-heat roll 222 receives the strip 12 from station C. The strip travels about 200° around the roll 222 and then to a second pre-heat roll 224. Rolls 222, 224 are provided with their own common cooling/heating circuit and maintain the strip 12 at the desired temperature. The strip 12 receives the now pre-formed and cooled bead 186 from transfer roll 208 approximately half way along its engagement with roll 224. Just before the transfer roll 208, the strip 12 is heated along a predetermined line offset from the centerline by a narrow band of heated air (about 1100° F.) from a heater 226 having a narrow arcuate nozzle 228. With this narrow band of the strip 12 heated to the desired temperature, the pre-formed bead 186 is applied to the heated area of the strip in continuous fashion immediately downstream of the heater nozzle 228. The two strands 12, 186 of material then enter the nip between rolls 208 and 224. Light pressure (about 5 to 9 lbs) applied by roll 208 aids in the bonding process as the bead 186 is pressed onto the heated strip 12. The form roll 190 and transfer roll 208 have their own common cooling circuit (with internal cooling as previously described in connection with station A) to cool the heated strip to the desired temperature. The heater/cooling parameters vis-a-vis rolls 190, 208, 222 and 224 are adjusted as necessary to achieve good bonding between the strip 186 and the strip 12.

Transfer roll 208 is adjustable via cylinder 230 and arm 232 which is pivotable about pin 234 to adjust the pressure at the nip between roll 208 and roll 224.

As the strip 12 (with pre-formed bead 186 applied) moves from roll 224, it passes about a tension roll 236, and a cooling roll 238, the latter cooled by a separate internal cooling circuit. Tension roll 236 is adjustable via cylinder 242 and arm 244, the latter pivotable about pin or shaft 246. The strip leaves station D via idler 240.

Figure 10A:
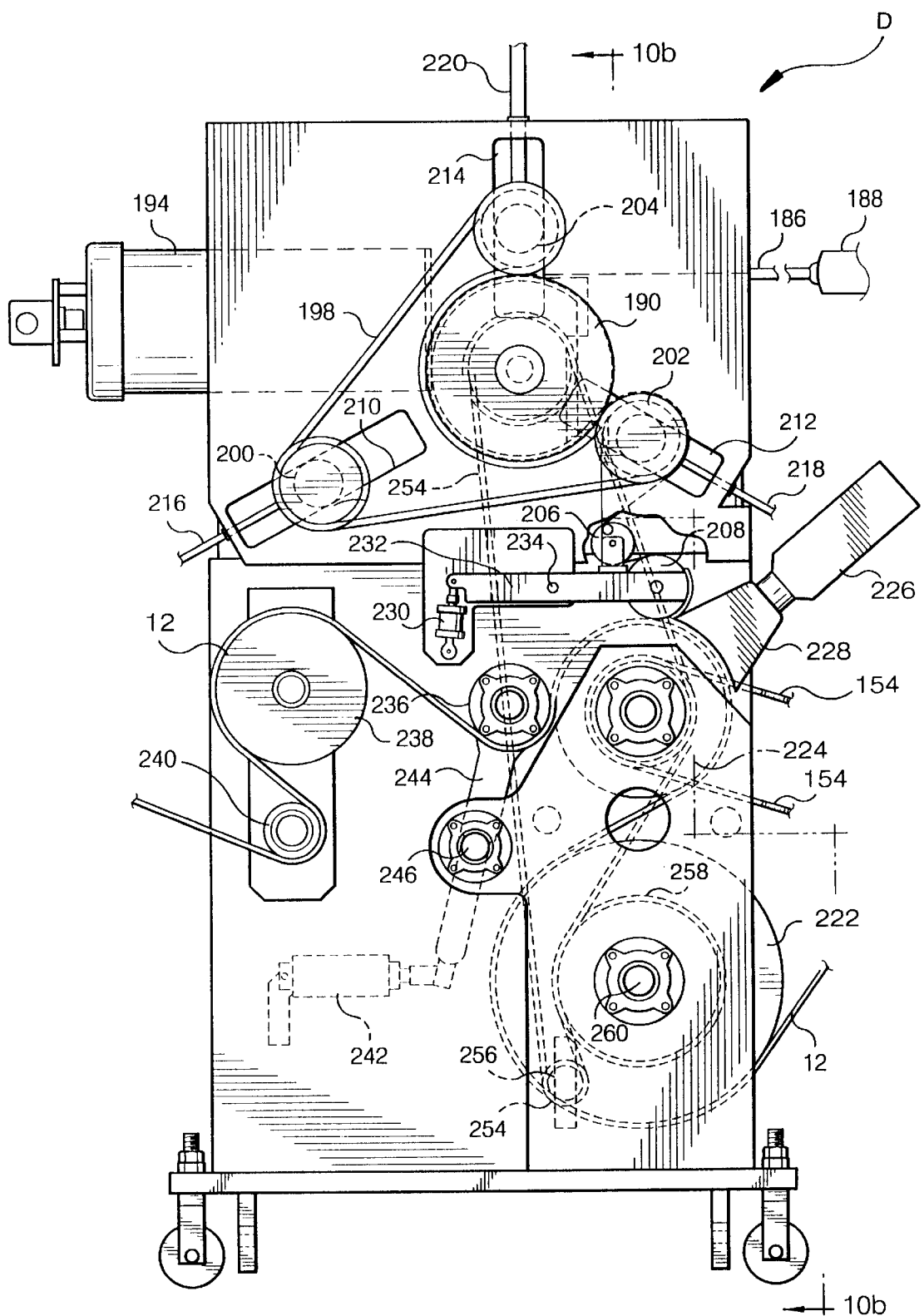
FIG. 10a is an enlarged end elevation of the module labeled D in FIG. 5.
Figure 10B:
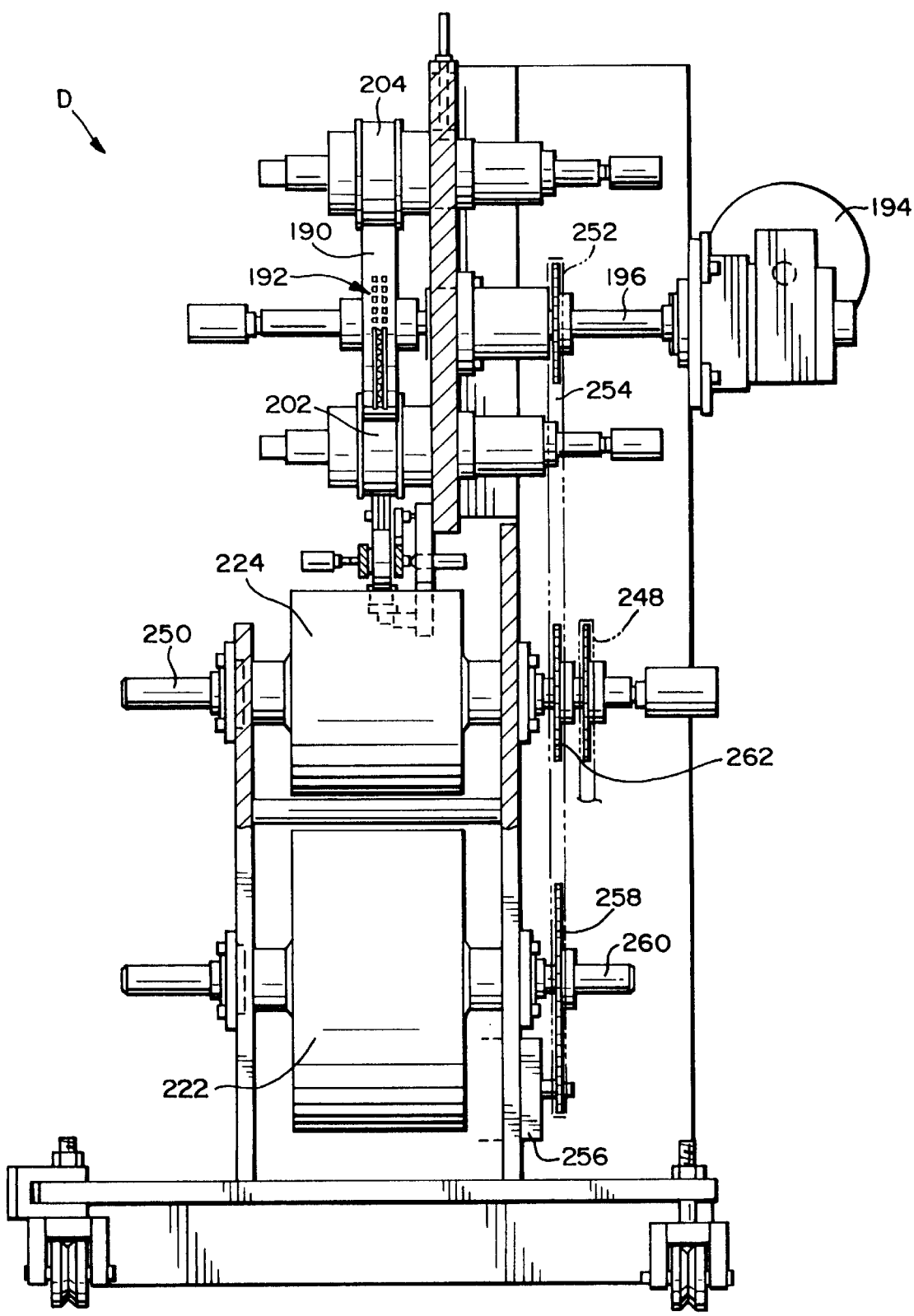
FIG. 10b is an end elevation of the module shown in FIG. 10a, partly in section and with some component parts removed for clarity.
Figure 11:
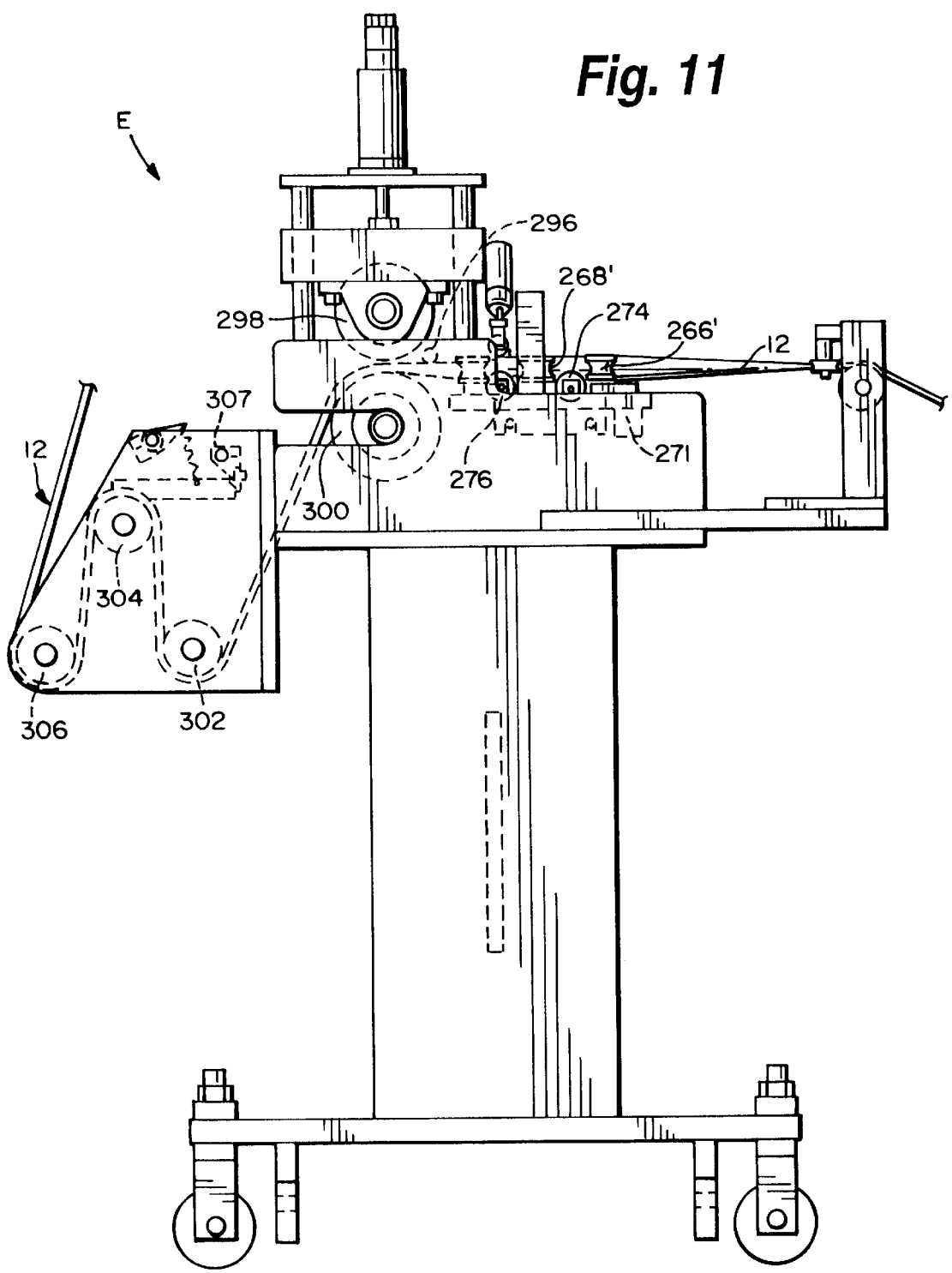
FIG. 11 is an end elevation of the module labeled E in FIG. 5.
Figure 12:
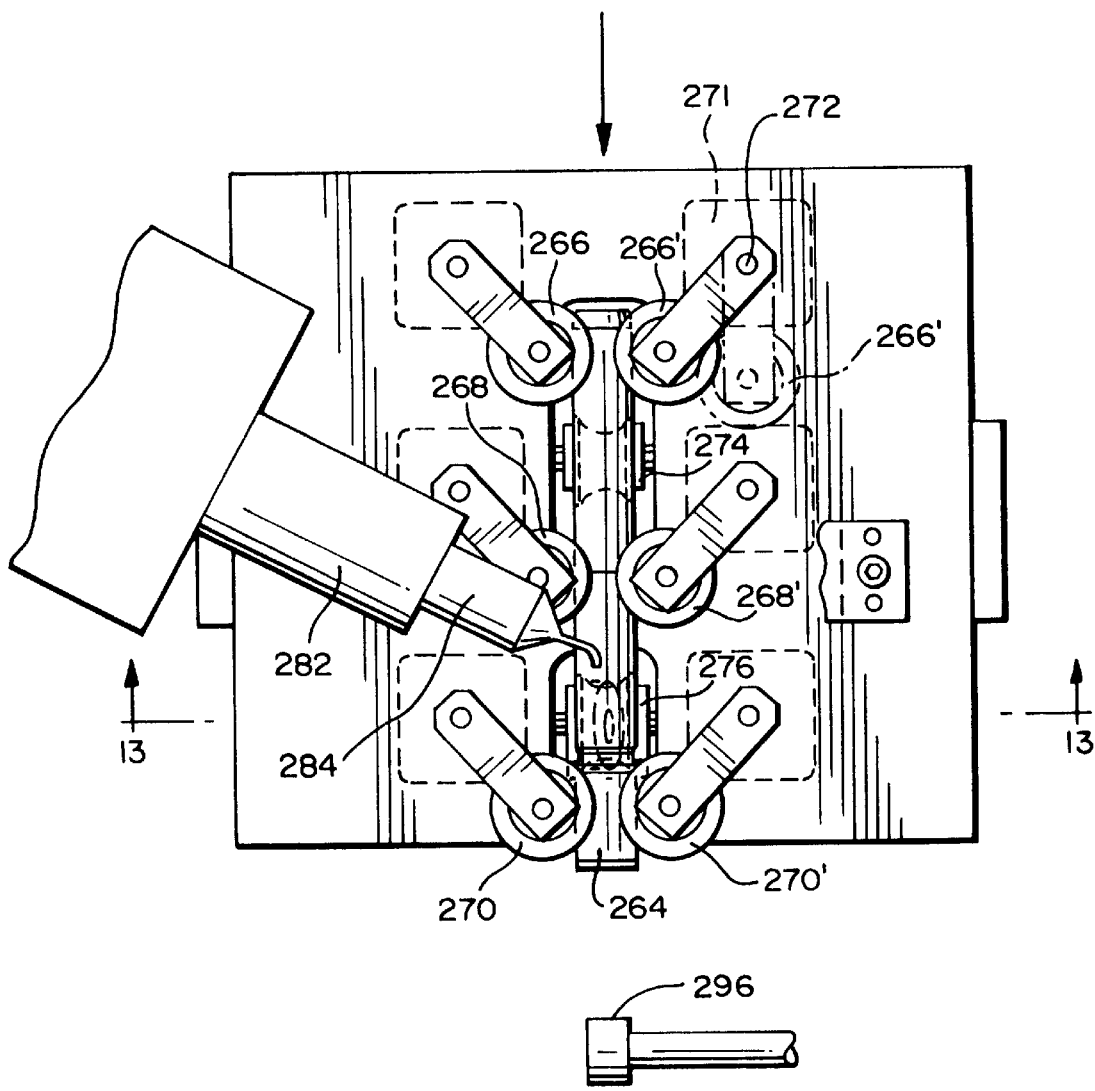
FIG. 12 is a partial plan view of the module illustrated in FIG. 11.

From FIGS. 10a, 10b, it can be seen that drive chain 154 (which drives the phase adjuster 136) is connected to a sprocket 248 on a shaft 250 which supports roll 224. At the same time, the motor driven form roll 190 has a sprocket 252 (FIG. 10b), fixed to shaft 196, by which a drive chain 254 is routed to a tension roll 256, a sprocket 258 on shaft 260 of roll 222, about a second sprocket 262 on shaft 250 and back to the sprocket 252. Thus, it is the motor 194 which determines the speed of the form roll 190 and pre-heat rolls 222, 224 as well as the slitter wheel 132 (via chain 154 and phase adjuster 136). As previously explained, however, the motor 194 is also slaved in series to the motor drive for the calendar stack at station A.

Figure 14:
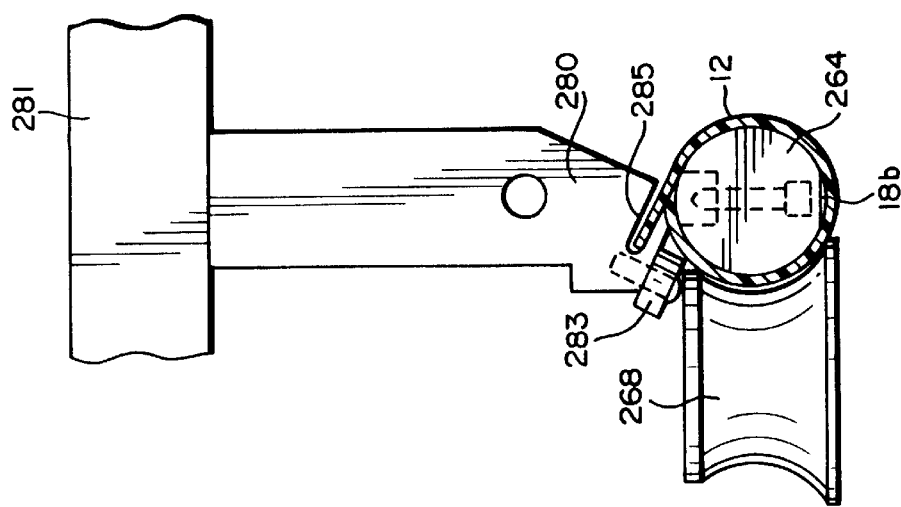
FIG. 14 is an enlarged detail of an edge guide used in the module illustrated in FIG. 11.
Figure 13:
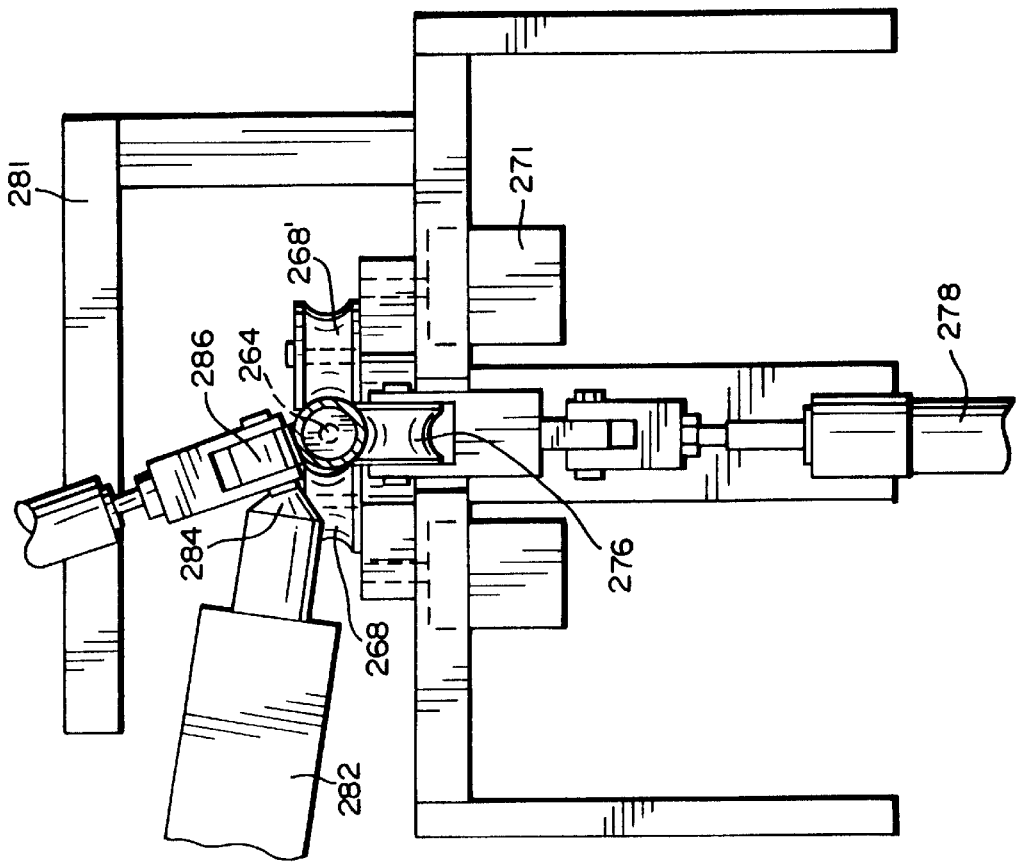
FIG. 13 is a partial end view of the module illustrated in FIG. 11.

With reference now to FIGS. 11–14, the strip 12 moves to station E where it is folded and seamed to its final tubular form. Initially, as the strip enters station E, it is guided or wrapped around a horizontally oriented cylindrical mandrel 264 (FIGS. 12–14) by roller pairs 266, 266', 268, 268' and 270, 270' which are movable laterally toward and away from the mandrel 264 by rotary actuators (one labelled at 271), which pivot the respective rollers about pivot pins (one indicated at 272) between inoperative and operative positions. Roller 266' is shown in phantom in an inoperative position in FIG. 12. Cooperating rollers 274, 276 located beneath the mandrel 264 are similarly movable into position by air cylinder 278 (FIG. 13) to hold the underside of the strip 12 against the mandrel. Movement of these rollers is necessary only prior to start-up, to allow the initial threading of the strip material through the various stations. Once the threading procedure is completed, the rollers 266 through 276 are moved to their operative positions, recognizing that the inherent flexibility of the strip material permits such movement. The rollers fold the strip over, as best seen in FIGS. 13 and 14, to a position where the longitudinal edges overlap. A stationary lap edge guide 280, supported by a frame bracket 281, is positioned above and approximately at a centerline between rollers 268, 268'. The edge guide 280 is shown in FIG. 14 but is omitted from FIG. 12 for the sake of clarity. This edge guide includes a slot 285 through which the upper edge of the strip 12 is threaded. The guide holds the upper edge of the strip 12 away from the lower edge to facilitate the application of a bonding or adhesive bead. At the same time, a roller 283 holds the lower edge against the mandrel 264. A third extruder 282 has a nozzle 284 oriented to deposit a sealing bead along the "lower" edge of the lapped seam, in continuous fashion. A pressure roller 286 is located immediately downstream of the nozzle 284, and applies pressure to the overlapped seam, sandwiching the overlapped edges between the mandrel 264 and the pressure roller 286.

Figure 15:
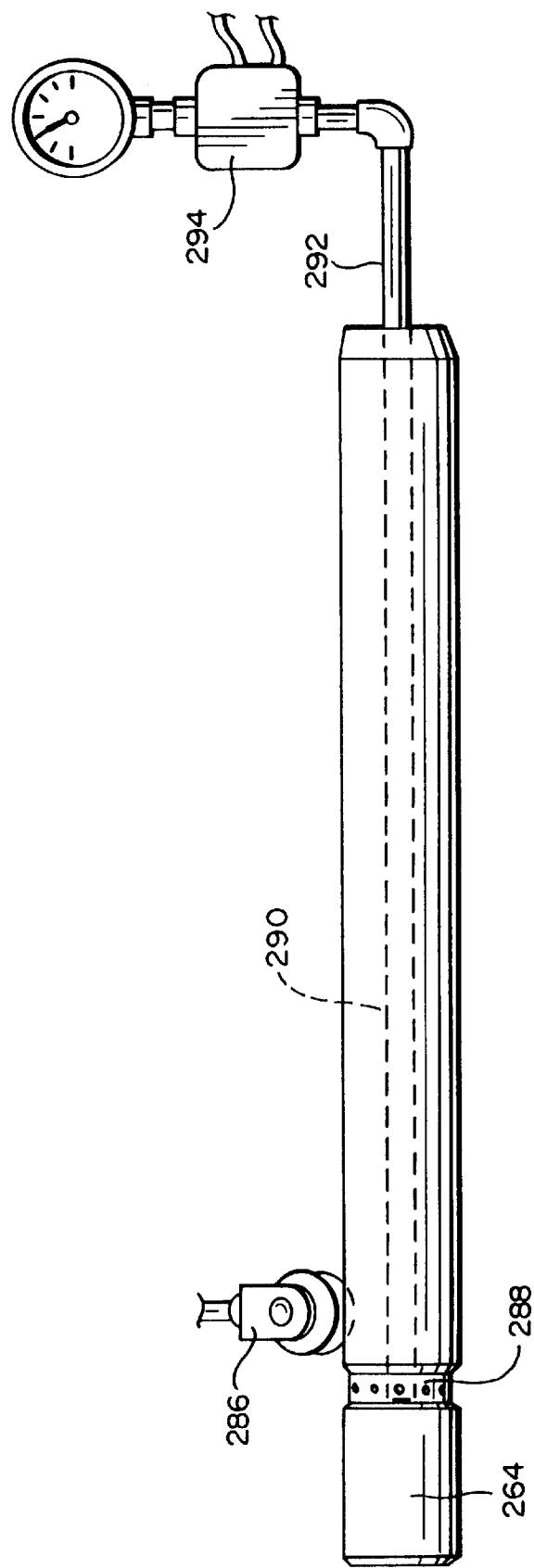
FIG. 15 is a schematic diagram of a vacuum arrangement for the mandrel at station E.

It should be noted here that for different diameter tapes, the roller/mandrel assembly can be changed out to accommodate strips of different widths. It should also be noted that the mandrel may be ported (FIG. 15) so that a vacuum can be pulled along the mandrel, insuring good sizing and seaming. Specifically, an annular ported groove 288 is formed in the mandrel, just forward of the roller 286, and communicates with an interior passage 290 extending axially along the mandrel. A pipe 292 connects the passage to a vacuum source 294. When the vacuum is applied, air about the mandrel is pulled into the passage 290, creating a low pressure area between the strip 12 and the mandrel, pulling the strip into contact with the mandrel. A tension roller 296 downstream of mandrel 264 is utilized to maintain the required tension on the seam to insure stabilization and sizing of the seam.

The downstream nip rolls 298, 300 flatten the strip and these rolls along with idler rolls 302, 304 and 306 (see FIG. 11) may be temperature stabilized by internal circuits to cool the seamed drip tape as it leaves station E. The idler rolls also provide a platform to monitor seam quality. This can be achieved by a sensor 307 which monitors the thickness of the seam. If the thickness drops below a predetermined level, the process is halted to determine the cause of, and to remove the defectively seamed area.

The seamed drip tape 12 is now advanced to an overhead cooling area F (refer to FIG. 5) which includes spaced roller sets 308, 310 which facilitate multiple back and forth passes of the tape to air cool the same. The number of passes between the roll sets is adjusted depending on the final temperature desired.

Finally, the tape enters the tension station G (FIG. 5), passing initially about guide rollers 312 and 314 mounted on a pivotable arm 316 which rocks about a pivot 318 before passing through the nip between tension rolls 320, 322. A load cell 324 on rocker arm measures tension and displays it digitally on screen (not shown). If the tension exceeds a predetermined level, then the tension rolls 320, 322 are adjusted as required to obtain the desired tension on the strip 12.

From the tension station G, the finished drip tape 12 is wound and packaged by means which form no part of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a process for forming irrigation drip tape, the steps of:
   a) supplying a longitudinally continuous strip of flexible plastic material in a first direction;
   b) heating a narrow band of said strip continuously along its length;
   c) depositing a continuous pre-formed bead of plastic material incorporating a plurality of secondary flow paths on an upper surface of said strip, along said narrow band, while said strip moves in said one direction, wherein said bead is preformed on a form wheel having a peripheral surface with a groove therein shaped to form said plurality of longitudinally spaced secondary flow paths in one surface of said bead, said opposite surface of said bead being substantially smooth, and wherein said bead is deposited on said upper surface of said strip such that said plurality of secondary flow paths face, and are closed by said upper surface of said strip;
   d) cooling said strip and said bead;
   e) folding said strip longitudinally so that said longitudinal edges overlap; and
   f) sealing said longitudinal edges to form a tubular drip tape with a longitudinal, overlapped seam, with said bead located inside said tubular drip tape and extending parallel to but remote from said overlapped seam.

2. The process of claim 1 wherein, prior to step a), said strip is extruded from a die onto an upper roll of a calendar stack.

3. The process of claim 2 including the step of cooling said extruded strip by supplying coolant to said calendar stack.

4. The process of claim 3 and including, prior to step b), the step of trimming said strip along opposite longitudinal edges thereof.

5. The process of claim 1 including, prior to step c), the step of forming a plurality of longitudinally spaced outlet slits in said strip, with one outlet slit provided for each secondary flow path.

6. The process of claim 5 wherein said slits are formed in said strip prior to step c).

7. The process of claim 1 wherein, prior to step c), said bead is extruded onto said form wheel.

8. The process of claim 7 and including the step of providing an endless belt which is arranged to wrap about at least part of said form wheel to maintain said extruded bead within said groove until said bead is deposited on said strip in step c).

9. The process of claim 8 wherein said endless belt is constructed of stainless steel.

10. The process of claim 1 wherein said bead is formed to include, for each secondary flow path, an inlet, a laminar flow region and a turbulence inducing region.

11. The process of claim 5 wherein said bead is formed to include, for each secondary flow path, an inlet, a laminar flow region and a turbulence inducing region, and wherein said one slit provides an outlet for liquid in said secondary flow path, adjacent the turbulence inducing region.

12. The process of claim 1 and including, following step f), air cooling said tubular drip tape.

13. The process of claim 12 including monitoring tension in said strip after sealing said longitudinal edges.

14. The process of claim 1 wherein step f) is carried out after applying a hot melt bead between said longitudinal edges and applying pressure to said overlapped seam.

15. In a method of forming agricultural drip tape wherein a primary flow path is formed by folding and seaming a continuous length of flexible plastic film along longitudinal edges thereof, and where a secondary flow path is provided on an interior surface of said film prior to folding and seaming, the further steps of forming the secondary flow path by:
   a) continuously extruding a thin bead of material into a peripheral groove formed in an external surface of a rotating form wheel, said groove having a secondary flow path configuration;
   b) confining said bead of material in said peripheral groove for at least part of the circumference of the wheel by engaging said wheel with an endless belt arranged to overlie said groove; and
   c) depositing said bead of material on said film along a narrow band of said film.

16. The method of claim 15 wherein said endless belt engages said form wheel for about 270° of the circumference of the wheel.

17. The method of claim 16 wherein said narrow band of said film is remote from said longitudinal edges.

18. The method of claim 17 wherein said film is heated along said narrow band before said bead is deposited thereon.

19. The method of claim 15 wherein said secondary flow path configuration of said groove is shaped to provide a plurality of inlets in laminar flow region; a turbulent flow region; and an outlet region and wherein, prior to step a), said film is slit and longitudinally spaced locations corresponding to respective outlet regions of said secondary flow path.

20. The method of claim 19 wherein said form wheel produces a plurality of secondary flow paths at longitudinally spaced locations along said bead, each secondary flow path isolated from adjacent secondary flow paths.

* * * * *

UNITED STATES PATENT AND TRADEMARK OFFICE

CERTIFICATE OF CORRECTION

PATENT NO.   : 6,120,634
DATED        : September 19, 2000
INVENTOR(S)  : HARROLD et al.

It is certified that error appears in the above-identified patent and that said letters patent is hereby corrected as shown below:

Column 4, line 45, delete "and" and insert --band--.

Column 8, lines 62 and 65, delete "102" and insert --98--.

Signed and Sealed this

Twenty-fourth Day of April, 2001

Attest:

NICHOLAS P. GODICI

Attesting Officer          Acting Director of the United States Patent and Trademark Office